April 24, 1962
F. W. AINSWORTH
3,030,814
CONTROL APPARATUS
Filed Nov. 12, 1959
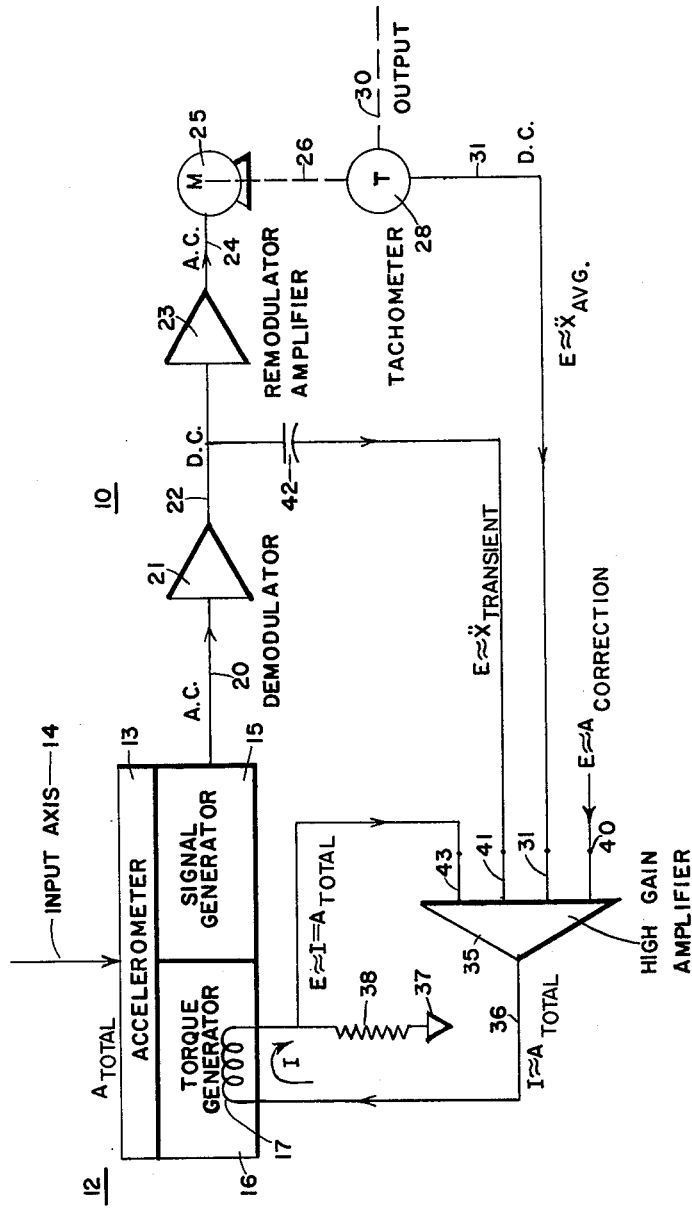
INVENTOR
FRANK W. AINSWORTH
BY Roger W. Jensen
ATTORNEY United States Patent Office 3,030,814
Patented Apr. 24, 1962

3,030,814
CONTROL APPARATUS
Frank W. Ainsworth, Clearwater, Fla., assignor to Minneapolis-Honeywell Regulator Company, Minneapolis, Minn., a corporation of Delaware
Filed Nov. 12, 1959, Ser. No. 852,535
4 Claims. (Cl. 73—503)

This invention pertains generally to control apparatus and more specifically to acceleration measuring and sensing apparatus. One type of accelerometer sensing apparatus which is widely used at the present time is similar to that shown in Patent 2,853,287 granted to C. S. Draper and Claude L. Emmerich. In this apparatus a pendulous element is pivotally mounted for rotation about an axis and has associating with it signal means for producing signals indicative of rotation of the pendulous element. Also associated with the pendulous element is a torque generator adapted to be energized and when energized to apply a torque to the pendulous element. The signal generator is adapted to be connected with a coupling network to the torque generator. The torque generator is thus energized by a signal which is a function of the output from the signal generator. The function of the torque generator is to apply a torque to the element which tends to be equal and positive to the torque caused by the initial input motion. The output signal from the signal generator is thus indicative of the acceleration sensed by the device. In many systems the accelerometer may be used in combination with additional means for producing a signal indicative of the integral of the acceleration with respect to time, or in other words, the velocity of the means upon which the accelerometer is mounted. This additional means which integrates the acceleration signal in the usual embodiment includes a rotatable motor adapted to be energized by the signal generator signal and the motor in turn drives a signal generating means which sometimes takes the form of a tachometer. The total amount of angular displacement of the motor is somewhat indicative of velocity but is subject to certain errors to be discussed below. Likewise, the angular velocity of the shaft is somewhat indicative of applied acceleration but likewise is subject to certain errors.

The system disclosed in FIGURE 2 of the referenced Draper et al. patent thus would be adapted to be connected to a motor type integrator not shown. More specifically, the output signal "e" would be adapted to energize the motor integrator. The shortcomings or disadvantages of this type of arrangement for producing a velocity signal is that the entire system is subject to the error of large amounts of noise in the acceleration signal causing saturation in the integrator and thus rectification of the signal. To explain, for high frequency vibrations applied to the accelerometer the prior art arrangement would have an output signal with a steady state component which is indicative of the undesired rectification which has taken place in the system.

The present invention overcomes the disadvantage of the prior arrangement by providing a motor driven tachometer in the rebalance loop to the torquer means of the accelerometer. Generally, the present invention would apply the signal from the accelerometer signal generator to energize and thus rotate the motor which in turn would drive a second signal generator means such as a tachometer. The angular displacement of the tachometer shaft becomes indicative of the integral with respect to time of the applied acceleration or in other words, the velocity. The angular velocity of the tachometer shaft becomes indicative of the average acceleration ($\ddot{x}_{avg.}$). An electrical signal produced by the tachometer is applied to a high-gain amplifier the output of which is applied to the torque generator means of the accelerometer. The present invention also provides as an optional feature, means for minimizing the so called "cross-coupling" or "vibra-pendulous" acceleration error. This is accomplished by coupling transient acceleration signals directly to the amplifier means where it is summed with the average acceleration signal from the tachometer and applied to the torque generator.

It is an object of this invention therefore to provide an improved control apparatus.

Another object of the invention is to provide an improved acceleration sensing system for producing accurate acceleration and velocity signals.

Still another object of the invention is to provide an acceleration sensing system which eliminates the problem of saturation in the integration means connected to the accelerometer with the result of rectification of the signal.

Other objects of the invention will be set forth more fully in and become apparent from a reading of the following specification and appended claims, in connection with the accompanying drawing which somewhat schematically represents one embodiment of the invention.

Referring to the drawing, the reference numeral 10 generally designates an acceleration measuring system. The system 10 comprises in part, an accelerometer 12 which may well be of the type depicted in FIGURE 1 of the Draper et al. Patent 2,853,287. Accordingly, the accelerometer is not shown in detail but is schematically shown to include a unit 13 adapted to respond to accelerations along an input axis 14. Thus, element 13 constitutes a seismic mass adapted to be displaced in respect to acceleration imparted thereto. The accelerometer shown also includes signal generator means 15 and torque generator means 16. The torque generator means includes in part an input means, depicted as a coil 17.

The signal generator means 15 is adapted to produce a signal as a function of displacement of the seismic mass away from a predetermined or initial position. This signal is applied to suitable output means schematically represented by a lead 20. Thus, a signal is produced at lead 20 indicative of seismic mass displacement and as shown is an alternating current signal, although in some devices the signal would take other forms. The lead 20 is connected to a suitable demodulator apparatus 21, the function of which is to demodulate the alternating current signal applied thereto and to produce at an output lead 22 thereof a direct current signal having a magnitude and polarity respectively indicative of the magnitude and phase of the applied A.C. signal. Lead 22 is shown connected to a suitable combination modulator and amplifier 23, a function of which is to remodulate the direct current signal applied thereto and to amplify the modulated signal. The output of device 23 is applied to output means such as lead 24 which in turn is connected to suitable motor means 25. Motor means 25 is thus adapted to be rotated in a direction and at a rate indicative of the sense and magnitude of the applied alternating current signal which in turn is indicative of the sense and magnitude of the displacement of the seismic mass. The motor 25 may be of any suitable type and is schematically represented as being connected through a connection means 26 to a second signal generator means such as a tachometer 28. The tachometer 28 as shown is adapted to have a mechanical output such as a shaft 30 and an electrical output schematically identified by lead 31. The tachometer 28 may be of any suitable type readily available.

A high-gain amplifier means 35 is provided for applying the tachometer output signal to the torque generator 16. Additionally, the high-gain amplifier serves as a convenient summing point as will be explained below. The electrical output of the tachometer 28 at lead 31 is connected to the amplifier 35. The amplifier 35 has an output means schematically represented by a lead 36 which is adapted to be connected to one side of the torque generator input winding means 17. The other side of the coil 17 is connected to ground 37 through a resistor 38. The output of the amplifier 35 is adapted to cause a current I to flow through the coil 17. Current I flowing through the resistor 38 develops a voltage which is indicative of the current which in turn is indicative of the total acceleration ($A_{total}$).

The amplifier 35 is depicted as having a total of four inputs which, it will be understood, is to designate a parallel summing type of arrangement well known to those skilled in the art. One of the inputs, namely lead 31, from the tachometer has already been mentioned. A second input as at 40 provides a means of applying a voltage for any desired correction signals ($A_{correction}$). A third input as at 41 is adapted to be connected through a suitable condenser 42 to lead 22 which, it will be recalled, has applied thereto a direct current voltage indicative of the sense and magnitude of the displacement of the seismic mass away from its normal position. The function of the condenser 42 is to pass high frequency acceleration changes directly to the amplifier 35. Thus, at lead 41 is developed a voltage proportional to the transient acceleration ($\ddot{x}_{transient}$). It will be understood that signals indicative of steady state acceleration acting on the seismic mass will not be conducted through the condenser 42 to the amplifier.

A fourth input at the amplifier means identified by reference numeral 43 is adapted to be connected to the ungrounded side of resistor 38 so that the voltage indicative of the total acceleration is applied to the amplifier. The summing network which comprises a part of the high-gain amplifier 35 satisfies the following equation:

$$A_{total} = A_{correction} + \ddot{x}_{average} + \ddot{x}_{transient}$$

It will be understood, therefore, that the high-gain amplifier produces an output signal which is indicative of the summation of the correction signal ($A_{correction}$) at input terminal 40, the average acceleration signal ($\ddot{x}_{avg.}$) at lead 31, and the transient acceleration signal ($\ddot{x}_{transient}$) at input 41. The nature of the acceleration correction signal ($A_{correction}$) may be selected according to the type of system in which the acceleration 10 is used. For example, in an inertial guidance system it may be desired to apply a correction for the "Coriolis" effect. The function of the high-pass capacitor 42 is to obtain fast rebalance in the accelerometer 12 in order to reduce cross-coupling or vibra-pendulous effects. In some applications it may be desired to eliminate the condenser 42 and the general application of transient acceleration signals to the amplifier. In this case, the correction means between the accelerometer signal generator 15 and the motor 25 may be somewhat simplified from that shown since the alternating current signal at lead 20 may be simply amplified and applied to the motor 25.

Operation

In operation the seismic mass of the accelerometer 12 would be in a predetermined or initial position in the absence of acceleration applied along the input axis 14. When accelerations are applied, then the seismic mass will be displaced in one sense or the other according to the sense of the applied acceleration and the signal generator means 15 will produce a signal as a function of the mass displacement. The signal so produced will have a sense and magnitude indicative of the sense and magnitude of the applied acceleration. The signal so produced is demodulated by unit 21 so as to produce a direct current signal at lead 22 which is applied to the remodulator and amplifier 23 so as to energize the motor 25. The motor 25 drives the tachometer 28 and the general function of the motor tachometer arrangement is to serve as a means of integrating the applied acceleration signal. The integral of the applied acceleration and velocity is indicated by the angular displacement of the output shaft 30 of the tachometer. An output signal at the electrical output 31 of the tachometer is indicative of its angular velocity and accordingly is indicative of the average acceleration ($\ddot{x}_{avg.}$). The average acceleration signal together with the transient acceleration ($\ddot{x}_{transient}$) are combined with any desired correction signal in the high-gain amplifier 35 the output of which is applied to the torque generator. The signal to the torque generator is such that the seismic mass has applied thereto a torque which tends to be equal and opposite to the original torque caused by the amplified acceleration.

In the present invention, in contrast to prior arrangements, any saturation and noise in the motor, coming from the accelerometer and tending to cause rectification in the motor, cannot cause rectification in the output signal. This is because the output signal is used to balance the accelerometer. The pendulous element must be driven to a zero average gimbal torque by the torquer current alone. This can only be accomplished by generating the proper value of average acceleration ($\ddot{x}_{avg.}$) at the tachometer shaft.

While I have shown and described a specific embodiment of this invention, further modification and improvement will occur to those skilled in the art. I desire to be understood, therefore, that this invention is not limited to the particular form shown and I intend in the appended claims to cover all modifications which do not depart from the spirit and scope of this invention.

I claim:
1. In acceleration responsive apparatus: a seismic mass adapted to be displaced in response to accelerations imparted thereto; first signal generator means controlled by said mass and adapted to produce a signal as a function of displacement of said mass away from a predetermined position; force generator means connected to said mass and responsive to an electric input; motor means connected to said first signal generator means and adapted to be actuated as a function of said first signal generator signal; second signal generator means, said second signal generator means being controlled by said motor means and adapted to produce a signal as a function of the actuation of said motor means; amplifier means having input means and output means; means connecting said second signal generator means to said amplifier input means; means including capacitor means connecting said first signal generator means to said amplifier input means; and means connecting said amplifier output means to said force generator means.

2. In acceleration responsive apparatus: a pendulous mass adapted to be rotated about an output axis in response to accelerations imparted thereto; first signal generator means controlled by said mass and adapted to produce a signal as a function of rotation of said mass away from a predetermined position; torque generator means connected to said mass responsive to an electric input, and adapted when energized to apply a torque to said pendulous mass; motor means connected to said first signal generator means and adapted to be actuated as a function of said first signal generator signal; second signal generator means, said second signal generator means being controlled by said motor means and adapted to produce a signal as a function of the actuation of said motor means; amplifier means having input means and output means; means connecting said second signal generator means to said amplifier input means; means including capacitor means connecting said first signal generator means to said amplifier input means; and means connecting said amplifier output means to said torque generator means.

3. In acceleration responsive apparatus: a seismic mass adapted to be displaced in response to accelerations imparted thereto; first signal generator means controlled by said mass and adapted to produce a signal as a function of displacement of said mass away from a predetermined position; force generator means connected to said mass and responsive to an electric input; motor means connected to said first signal generator means and adapted to be rotated as a function of said first signal generator signal; tachometer signal generator means connected to said motor means and adapted to produce a signal as a function of rotation of said motor means; high-gain amplifier means having input means and output means; means connecting said tachometer signal generator means to said amplifier input means; means including capacitor means connecting said first signal generator means to said amplifier input means; and means connecting said amplifier output means to said force generator means.

4. In acceleration responsive apparatus: a seismic mass adapted to be displaced in response to accelerations imparted thereto; first signal generator means controlled by said mass and adapted to produce a signal as a function of displacement of said mass away from a predetermined position; force generator means connected to said mass and responsive to an electric input; motor means connected to said first signal generator means and adapted to be actuated as a function of said first signal generator signal; second signal generator means; said second signal generator means being controlled by said motor means and adapted to produce a signal as a function of the actuation of said motor means; amplifier means having input means and output means; means connecting said second signal generator means to said amplifier input means; means including capacitor means connecting said first signal generator means to said amplifier input means; means fo rapplying to said amplifier input means a signal indicative of the input signal to said force generator means; means for applying to said amplifier input means a correction signal; and means connecting said amplifier output means to said force generator means.

References Cited in the file of this patent
UNITED STATES PATENTS

| | | |
|---|---|---|
| 2,690,531 | Marggraf et el. | Sept. 28, 1954 |
| 2,814,768 | Kinkel | Nov. 26, 1957 |
| 2,831,155 | Marggraf et al. | Apr. 15, 1958 |
| 2,853,287 | Draper et al. | Sept. 23, 1958 |
| 2,933,298 | Allison | Apr. 19, 1960 |
| 2,948,156 | Barkalow | Aug. 9, 1960 |